United States Patent
Hu et al.

(10) Patent No.: US 11,263,139 B2
(45) Date of Patent: Mar. 1, 2022

(54) HARDWARE ACCELERATORS AND ACCESS METHODS THEREOF

(71) Applicant: Shanghai Zhaoxin Semiconductor Co., Ltd., Shanghai (CN)

(72) Inventors: Di Hu, Beijing (CN); Zongpu Qi, Beijing (CN); Wei Zhao, Beijing (CN); Jin Yu, Shanghai (CN); Lei Meng, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 218 days.

(21) Appl. No.: 15/797,527

(22) Filed: Oct. 30, 2017

(65) Prior Publication Data

US 2019/0073312 A1 Mar. 7, 2019

(30) Foreign Application Priority Data

Sep. 6, 2017 (CN) .......................... 201710796762.0

(51) Int. Cl.
*G06F 12/0875* (2016.01)
*G06F 12/0888* (2016.01)
*G06F 12/0811* (2016.01)
*G06F 12/084* (2016.01)

(52) U.S. Cl.
CPC ........ *G06F 12/0875* (2013.01); *G06F 12/084* (2013.01); *G06F 12/0811* (2013.01); *G06F 12/0888* (2013.01); *G06F 2212/1024* (2013.01); *G06F 2212/1044* (2013.01); *G06F 2212/283* (2013.01); *G06F 2212/452* (2013.01)

(58) Field of Classification Search
CPC ............. G06F 12/0875; G06F 12/0811; G06F 12/084; G06F 12/0888; G06F 2212/1024; G06F 2212/1044; G06F 2212/283; G06F 2212/452
See application file for complete search history.

(56) References Cited

U.S. PATENT DOCUMENTS

| | | | | |
|---|---|---|---|---|
| 5,253,351 A | * | 10/1993 | Yamamoto | .......... G06F 12/0866 711/113 |
| 10,339,061 B2 | | 7/2019 | Hady et al. | |
| 2002/0087803 A1 | * | 7/2002 | Jones | ................... G06F 12/0888 711/138 |

(Continued)

FOREIGN PATENT DOCUMENTS

| | | | |
|---|---|---|---|
| CN | 101470691 A | 7/2009 | |
| CN | 104765701 A | 7/2015 | |
| WO | WO-2009109891 A * | 9/2009 | ......... G06F 12/0888 |

*Primary Examiner* — William E. Baughman
*Assistant Examiner* — Janice M. Girouard
(74) *Attorney, Agent, or Firm* — McClure, Qualey & Rodack, LLP

(57) ABSTRACT

A processing system includes a cache, a host memory, a CPU and a hardware accelerator. The CPU accesses the cache and the host memory and generates at least one instruction. The hardware accelerator operates in a non-temporal access mode or a temporal access mode according to the access behavior of the instruction. The hardware accelerator accesses the host memory through an accelerator interface when the hardware accelerator operates in the non-temporal access mode, and accesses the cache through the accelerator interface when the hardware accelerator operates in the temporal access mode.

16 Claims, 3 Drawing Sheets

(56) References Cited

U.S. PATENT DOCUMENTS

| | | | |
|---|---|---|---|
| 2008/0046736 A1* | 2/2008 | Arimilli | G06F 12/0888 |
| | | | 713/176 |
| 2009/0216958 A1* | 8/2009 | Biles | G06F 13/1668 |
| | | | 711/148 |
| 2016/0179387 A1* | 6/2016 | Gaur | G06F 3/0604 |
| | | | 711/135 |
| 2016/0188466 A1* | 6/2016 | Hady | G06F 15/167 |
| | | | 711/120 |
| 2018/0285279 A1* | 10/2018 | Akin | G06F 12/0831 |

* cited by examiner

HARDWARE ACCELERATORS AND ACCESS METHODS THEREOF

CROSS REFERENCE TO RELATED APPLICATIONS

This Application claims priority of China Patent Application No. 201710796762.0, filed on Sep. 6, 2017, the entirety of which is incorporated by reference herein.

BACKGROUND OF THE INVENTION

Field of the Invention

The disclosure relates generally to methods for controlling the access behaviors of hardware accelerators.

Description of the Related Art

Hardware accelerators, such as accelerator function unit (AFU), are primarily configured to accelerate some specific calculation tasks, in which the specific tasks calculated by the CPU may lead to lower efficiency. The dedicated hardware logic of a hardware accelerator is designed, through a process of analysis, to execute calculation tasks for improving efficiency. In an operating system platform for multi-user and multi-task executed in parallel, there is demand for accelerating the process of multi-applications or multi-execution streams.

In addition, a hardware accelerator usually shares the cache, such as the last-level cache (LLC), and the host memory with multiple cores of the CPU. Most of the access requests from a hardware accelerator are non-temporal locality access mode which is abbreviated to non-temporal access mode in the following paragraphs. That is, the memory addresses accessed by the access requests will not be repeatedly accessed. A compression accelerator is illustrated herein that the data is read, compressed, and then written back all at once such that repeated access may not be required. If the data is placed in the cache, it may result in cache pollution in the cache. Conversely, if the access request of the hardware accelerator is a temporal locality access mode which is abbreviated to temporal access mode in the following paragraphs, the data placed in the cache could improve the speed of reading and writing. Therefore, we need to optimize the access behaviors of the hardware accelerator.

BRIEF SUMMARY OF THE INVENTION

In one embodiment, a processing system comprises a cache, a host memory, a CPU, and a hardware accelerator. The CPU accesses the cache and the host memory and generates at least one instruction. The hardware accelerator operates in a non-temporal access mode or a temporal access mode according to the access behavior of the instruction. The hardware accelerator accesses the host memory through an accelerator interface when the hardware accelerator operates in the non-temporal access mode. The hardware accelerator accesses the cache through the accelerator interface when the hardware accelerator operates in the temporal access mode.

In one embodiment, an access method which is adapted in a hardware accelerator is provided. The CPU accesses a cache and a host memory and generates at least one instruction. The access method comprises: receiving the instruction; operating in a non-temporal access mode or a temporal access mode according to an access behavior of the instruction; when operating in the non-temporal access mode, accessing the host memory through an accelerator interface; and when operating in the temporal access mode, accessing the cache through the accelerator interface.

The processing device and the access method provided herein is adopted in the architecture of a hardware accelerator and a CPU sharing the high-speed cache and the host memory, which is configured to dynamically determine the access mode of the hardware accelerator according to the access behavior of the instructions. Not only the high-speed cache is prevented from pollution, but also the access efficiency is improved.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
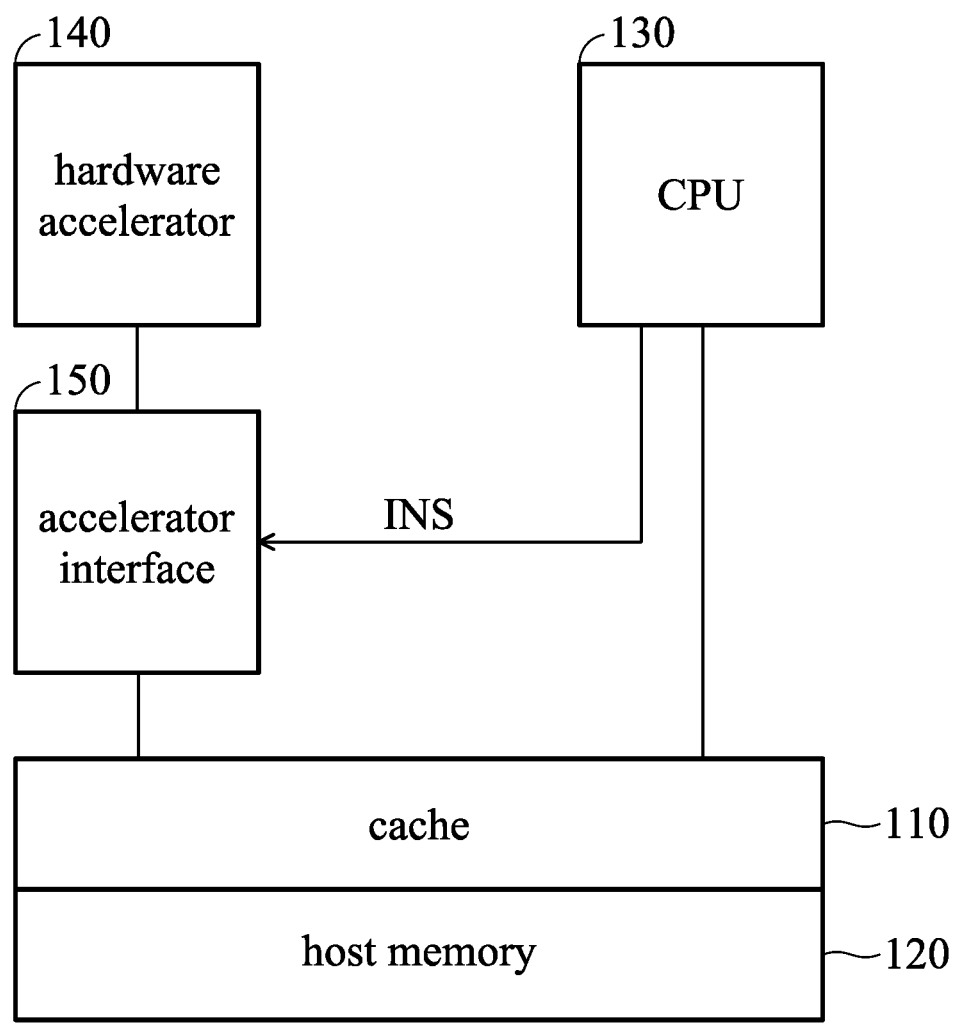
FIG. 1 is a processing system in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a processing system in accordance with an embodiment of the invention. As shown in FIG. 1, the processing system 100 includes a cache 110, a host memory 120, a CPU 130, a hardware accelerator 140, and an accelerator interface 150.

According to an embodiment of the invention, the processing system 100 may include a plurality of hardware accelerators 140. One hardware accelerator 140 is illustrated herein for explanation, but it is not limited thereto. In addition, the CPU 130 may include a plurality of processing cores, but it is not limited thereto. According to an embodiment of the invention, the cache 110 can be a last-level cache (LLC) of the processing system 100, but it is not limited thereto. The cache 110 can be other hierarchy of cache in the processing system 100.

The CPU 130 directly accesses the cache 110 and the host memory 120 to generate at least one instruction INS. According to an embodiment of the invention, the hardware accelerator 140 receives the instruction INS through the accelerator interface 150 which is configured to be an interface between the hardware accelerator 140 and other modules in the processing system 100, such as a communication interface between the hardware accelerator 140 and the CPU 130/the cache 110/host memory 120. The hardware accelerator 140 operates in a non-temporal access mode or a temporal access mode according to the access behavior of the instruction INS. According to an embodiment of the invention, when the hardware accelerator 140 operates in the non-temporal access mode, the hardware accelerator 140 directly accesses the host memory 120 through the accelerator interface 150, without accessing the cache 110. More specifically, in an embodiment, when the hardware accelerator 140 operates in the non-temporal access mode and the instruction INS is a write instruction, the hardware accelerator 140 directly writes the data of the instruction INS to the host memory 120 through the accelerator interface 150 and invalidates the data corresponding to the same address of the writing data in the cache 110. When the hardware accelerator 140 operates in the non-temporal access mode, the instruction INS is a read instruction, and the cache 110 has the corresponding data (i.e., cache hit), the hardware accelerator 140 reads the data from the cache 110; when the cache 110 does not has the corresponding data (i.e., cache miss), the hardware accelerator 140 reads from the host memory 120 but not cache in the cache 110.

For example, when the instruction INS is a compression instruction, it indicates that the hardware accelerator 140 only needs to read the data corresponding to the address of the instruction all at once, compresses it, and then writes it back. It is not necessary to repeatedly access the data corresponding to the address of the instruction INS such that it is not necessary to cache the data corresponding to the address of the instruction INS in the cache 110. Therefore, the hardware accelerator 140 directly accesses the host memory 120 to protect the cache 110 from pollution.

According to another embodiment of the invention, when the hardware accelerator 140 operates in the temporal access mode, the hardware accelerator 140 accesses the cache 110 through the accelerator interface 150. For example, when the hardware accelerator 140 needs to repeatedly access the data corresponding to the address of the instruction INS, the data is cached in the cache 110 and the hardware accelerator 140 operates in the temporal access mode to access the cache 110 to improve the access efficiency of the hardware accelerator 140.

According to an embodiment of the invention, the designer of the instruction INS may indicate in a section of the instruction INS that the access behavior of the instruction INS is a non-temporal access mode or a temporal access mode. When the hardware accelerator 140 receives the instruction INS, the hardware accelerator 140 operates in the non-temporal access mode or the temporal access mode according to the section of the instruction INS. It is noticed that the software designer would specify the instruction executed by the CPU 130 is in the non-temporal access mode or the temporal access mode, such as LoadNT/StoreNT, in which NT indicates non-temporal, and Load/Store, in which temporal is a default. The CPU 130 further transmits the instruction INS to the hardware accelerator 140 through the accelerator interface 150. According to an embodiment of the invention, the instruction INS is in a format of command packet including a specified section specifying the access behavior to be the non-temporal access mode or the temporal access mode.

According to another embodiment of the invention, the hardware accelerator 140 may monitor its own access behavior of previous instruction INS to adjust the access behavior of the received instruction INS. The detailed action is described in the following paragraphs.

Figure 2:
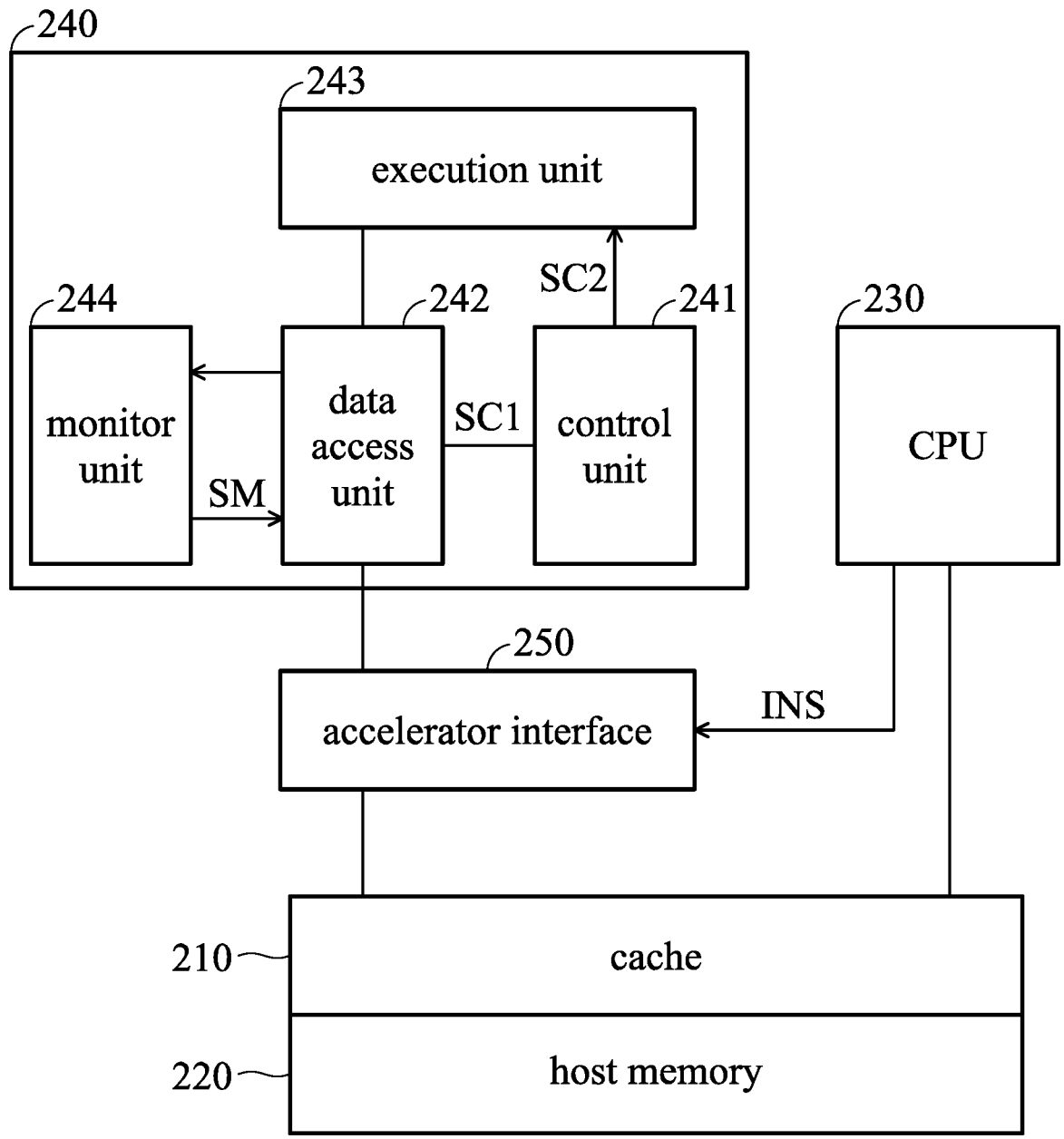
FIG. 2 is a block diagram in accordance with an embodiment of the invention.

FIG. 2 is a block diagram in accordance with an embodiment of the invention. As shown in FIG. 2, the processing system 200 includes a cache 210, a host memory 220, a CPU 230, a hardware accelerator 240 and an accelerator interface 250, in which the cache 210, the host memory 220, the CPU 230, and the accelerator interface 250 respectively correspond to the cache 110, the host memory 120, the CPU 130, and the accelerator interface 150.

As shown in FIG. 2, the hardware accelerator 240 includes a control unit 241, a data access unit 242, an execution unit 243, and a monitor unit 244. The data access unit 242 accesses data through the accelerator interface 250 according to the instruction INS, and the data access unit 242 operates in the non-temporal access mode or the temporal access mode according to the mode signal SM.

The monitor unit 244 monitors the access behavior that the data access unit 242 executes according to the instruction INS to generate the mode signal SM.

According to an embodiment of the invention, the control unit 241 receives the instruction INS to generate the first control signal SC1 and the second control signal SC2. The execution unit 243 executes a logic calculation on the data accessed by the data access unit 242 according to the second control signal SC2. The data access unit 242 accesses the data through the accelerator interface 150 according to the first control signal SC1.

According to an embodiment of the invention, when the monitor unit 244 determines that the access behavior of the data access unit 242 during the execution of the previous instruction INS is the non-temporal access mode, the monitor unit 244 generates the mode signal SM so that the data access unit 242 operates in the non-temporal access mode. When receiving the instruction INS once again, the data access unit 242 controls the accelerator interface 250 to operate in the non-temporal access mode, such that the accelerator interface 250 directly accesses the host memory 220.

According to another embodiment of the invention, when the monitor unit 244 determines that the access behavior of the data access unit 242 during the execution of the previous instruction INS is the temporal access mode, the monitor unit 244 generates the mode signal SM so that the data access unit 242 operates in the temporal access mode. When receiving the instruction INS once again, the data access unit 242 controls the accelerator interface 250 to operate in the temporal access mode, such that the accelerator interface 250 directly accesses the cache 210.

According to an embodiment of the invention, the monitor unit 244 further includes an address register which is configured to store the address previously accessed by the data access unit 242 according to the previous instruction INS, and the monitor unit 244 determines that there is a difference value between the currently accessed address and the previously accessed address.

When the monitor unit 244 determines that the difference value exceeds a predetermined length, the monitor unit 244 generates the mode signal SM, so that the data access unit 242 operates in the non-temporal access mode. When the monitor unit 244 determines that the difference value does not exceed the predetermined length, the monitor unit 244 generates the mode signal SM, so that the data access unit 242 operates in the temporal access mode.

According to an embodiment of the invention, the predetermined length is the cache line size. According to other embodiment of the invention, the predetermined length could be determined by the designer.

According to another embodiment of the invention, the monitor unit 244 further includes an address register, a plurality of access-number registers, a sub-region counting register, a first threshold register and a second threshold register, in which the address register is configured to store the initial address that the data access unit 242 initially accessed according to the initially-received instruction. Each of the access-number registers is configured to store an access number of times of each sub-region, the sub-region counting register is configured to count the number of the sub-regions that the access number of times exceeds the first threshold, and the first threshold register and the second threshold register are configured to respectively store a first threshold and a second threshold.

The monitor unit 244 monitors a watching window with a predetermined range starting from the initial address, divides the predetermined range into a plurality of sub-regions, and counts the access number of times of each sub-region. The monitor unit 244 further compares the access number of times of each sub-region with the first threshold. When the access number of times exceeds the first threshold, it indicates that the access behavior of the sub-region is temporal and the sub-region counting register is plus 1. According to an embodiment of the invention, each sub-region is the cache line size, the predetermined range is illustrated to include 64 cache line size, and a cache line size is illustrated to be 64 bytes so that the predetermined range including 4K bytes is illustrated herein. Therefore, the monitor unit 244 is configured to monitor the access addresses falling in the 4K watching window starting from the initial address. The sub-regions and the size of the watching window are illustrated herein, but not intended to be limited thereto.

When the currently-accessed address that the data access unit 242 is currently accessing according to an instruction exceeds the sum of the initial address that previously mentioned and the predetermined range, the monitor unit 244 compares the sub-region counting register with the second threshold.

When the value of the sub-region counting register (i.e., the number of the sub-regions that the access number of times exceeds the first threshold) exceeds the second threshold, the monitor unit 244 generates the mode signal SM, so that the data access unit 242 operates in the temporal access mode; when the value of the sub-region counting register (i.e., the number of the sub-regions that the access number of times exceeds the first threshold) does not exceed the second threshold, the monitor unit 244 generates the mode signal SM, so that the data access unit 242 operates in the non-temporal access mode. According to an embodiment of the invention, the first threshold and the second threshold could be determined by the designer.

According to another embodiment of the invention, the monitor unit 244 may be placed inside of the accelerator interface 250, which directly analyzes and monitors the addresses accessed by executing the instruction INS to determine whether the hardware accelerator 240 operates in the non-temporal access mode or the temporal access mode.

Figure 3:
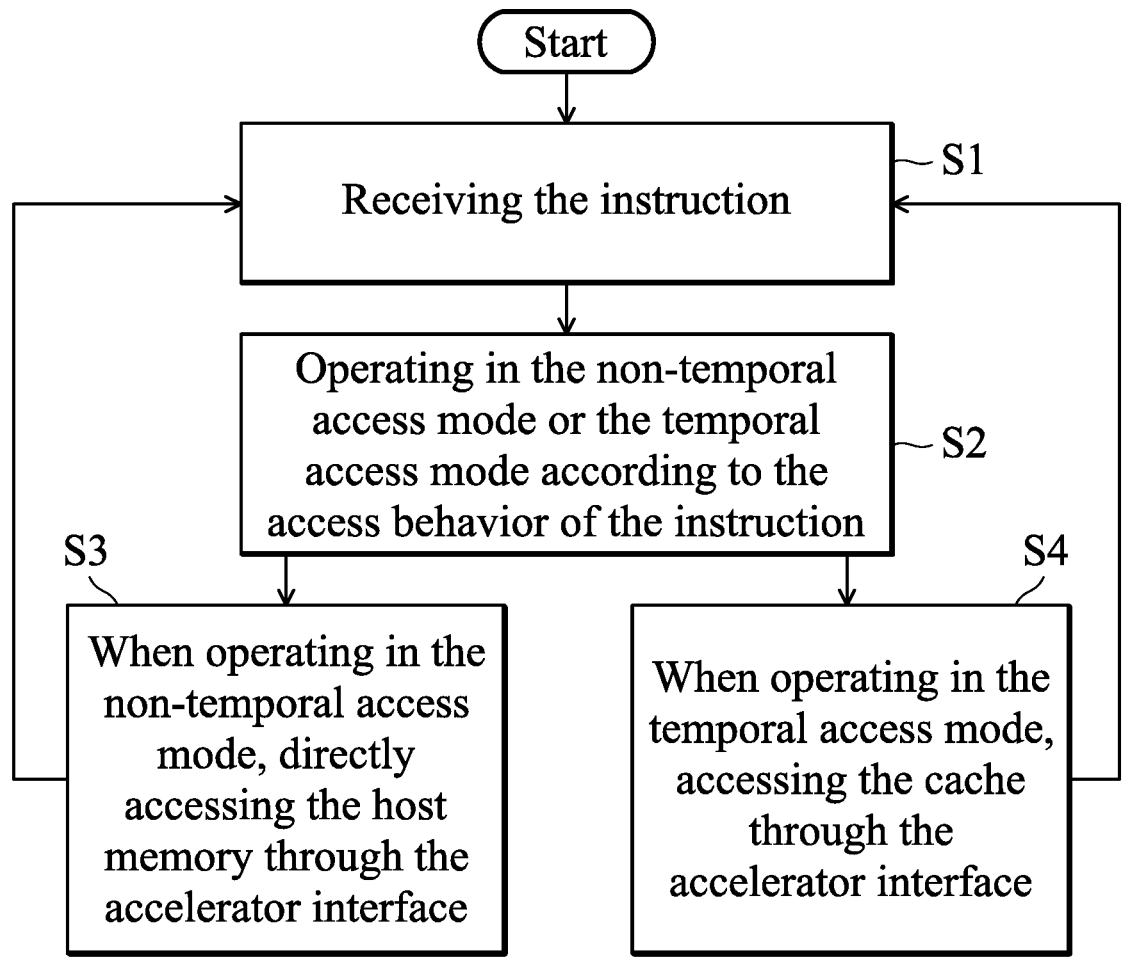
FIG. 3 is a flow chart in accordance with an embodiment of the invention.

FIG. 3 is a flow chart in accordance with an embodiment of the invention. The description of the flow chart in FIG. 3 is accompanied by FIG. 1 for a detailed explanation.

First, the hardware accelerator 140 receives the instruction INS (Step S1). The hardware accelerator 140 operates in the non-temporal access mode and the temporal access mode according to the access behavior of the instruction INS (Step S2).

When the hardware accelerator 140 operates in the non-temporal access mode, the host memory 120 is directly accessed through the accelerator interface 150 (Step S3) to protect the cache 110 from pollution. When the hardware accelerator 140 operates in the temporal access mode, the cache 110 is accessed through the accelerator interface 150 (Step S4) to improve access efficiency. When receiving the instruction INS once again, the method returns to Step S1. As described above, the embodiments of determining whether the hardware accelerator 140 to operate in the non-temporal access mode or the temporal access mode according to the instruction INS include the description of FIGS. 1 and 2 which is respectively configured to recognize the specific sections of the instruction INS and to monitor the addresses accessed by executing the instruction INS. It will not be repeatedly described herein.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A processing system, comprising:
   a cache;
   a host memory;
   a CPU, bypassing an accelerator interface to directly access the cache and the host memory and generating at least one instruction, wherein when the CPU directly accesses the cache and the host memory, the CPU does not utilize the accelerator interface or a hardware accelerator;
   the hardware accelerator, receiving the instruction from the CPU through the accelerator interface, operating in a non-temporal access mode or a temporal access mode according to an access behavior of the instruction received from the CPU through the accelerator interface, wherein the hardware accelerator accesses the host memory through the accelerator interface when the hardware accelerator operates in the non-temporal access mode, wherein the hardware accelerator accesses the cache through the accelerator interface when the hardware accelerator operates in the temporal access mode; and
   a monitor unit, monitoring multiple addresses of the access behavior that the hardware accelerator executes according to the instruction to determine whether the hardware accelerator operates in the non-temporal access mode or the temporal access mode, wherein the monitor unit is placed inside of the accelerator interface.

2. The processing system of claim 1, wherein the instruction comprises a section configured to inform the hardware accelerator to operate in the non-temporal access mode or the temporal access mode.

3. The processing system of claim 1, wherein the hardware accelerator further comprises:
a data access unit, accessing data through the accelerator interface according to the instruction and operating in the non-temporal access mode or the temporal access mode according to a mode signal, wherein the monitor monitors the access behavior that the data access unit operates according to the instruction to generate the mode signal.

4. The processing system of claim 3, wherein the hardware accelerator further comprises:
a control unit, receiving the instruction to generate a first control signal and a second control signal; and
an execution unit, executing a logical calculation on the data according to a second control signal, wherein the data access unit accesses the data through the accelerator interface according to the first control signal.

5. The processing system of claim 3, wherein the monitor unit records a previously-accessed address that the data access unit previously accessed according to a previous instruction and determines a difference value between a currently-accessed address that the data access unit is currently accessing according to a current instruction and the previously-accessed address, wherein when the difference value exceeds a predetermined length, the monitor unit generates the mode signal, so that the data access unit operates in the non-temporal access mode, wherein when the difference value does not exceed the predetermined length, the monitor unit generates the mode signal, so that the data access unit operates in the temporal access mode.

6. The processing system of claim 3, wherein the monitor unit records an initial address that the data access unit initially accessed according to an initial instruction and monitors a predetermined range from the initial address, wherein the monitor unit divides the predetermined range into a plurality of sub-regions and counts an access number of times of each sub-region, wherein when a currently-accessed address that the data access unit is currently accessing according to a current instruction exceeds a sum of the initial address and the predetermined range, the monitor unit counts a number of the sub-regions that the access number of times of each sub-region exceeds a first threshold, wherein when the number of the sub-regions that the access number of times of each sub-region exceeds the first threshold does not exceed a second threshold, the monitor unit generates the mode signal, so that the data access unit operates in the non-temporal access mode.

7. The processing system of claim 6, wherein when the number of the sub-regions that the access number of times of each sub-region exceeds the first threshold exceeds the second threshold, the monitor unit generates the mode signal so that the data access unit operates in the temporal access mode.

8. The processing system of claim 1, wherein when operating in the non-temporal access mode, the hardware accelerator directly writes writing data of the instruction to the host memory through the accelerator interface and invalidates data corresponding to the same address of the writing data in the cache.

9. An access method, adapted in a hardware accelerator, wherein a CPU bypasses an accelerator interface to directly access a cache and a host memory and generates at least one instruction, wherein when the CPU directly accesses the cache and the host memory, the CPU does not utilize the accelerator interface or the hardware accelerator, comprising:
receiving, by the hardware accelerator through the accelerator interface, the instruction from the CPU;
operating, by the hardware accelerator, in a non-temporal access mode or a temporal access mode according to an access mode of the instruction received from the CPU through the accelerator interface;
when operating in the non-temporal access mode, accessing, by the hardware accelerator, the host memory through the accelerator interface; and
when operating in the temporal access mode, accessing, by the hardware accelerator, the cache through the accelerator interface,
wherein the step of operating in the non-temporal access mode or the temporal access mode according to the access behavior of the instruction further comprises:
monitoring, by the hardware accelerator, multiple addresses of the access behavior that the hardware accelerator executes according to the instruction to determine whether the hardware accelerator operates in the non-temporal access mode or the temporal access mode.

10. The access method of claim 9, wherein the instruction comprises a section, wherein the step of operating in the non-temporal access mode or the temporal access mode according to the access behavior of the instruction further comprises:
retrieving the section of the instruction to operate in the non-temporal access mode or the temporal access mode.

11. The access method of claim 9, wherein the step of operating in the non-temporal access mode or the temporal access mode according to the access behavior of the instruction further comprises:
monitoring an access behavior of a data access unit to generate a mode signal; and
operating the data access unit in the non-temporal access mode or the temporal access mode according to the mode signal.

12. The access method of claim 11, wherein the step of operating in the non-temporal access mode or the temporal access mode according to the access behavior of the instruction further comprises:
receiving the instruction to generate a first control signal and a second control signal; accessing, using the data access unit, data through the accelerator interface according to the first control signal; and
executing a logical calculation on the data according to the second control signal.

13. The access method of claim 11, wherein the step of monitoring the access behavior of the data access unit to generate the mode signal further comprises:
recording a previously-accessed address that the data access unit previously accessed according to a previous instruction;
determining a difference value between a currently-accessed address that the data access unit is currently accessing according to a current instruction and the previously-accessed address; when the difference value exceeds a predetermined length, generating the mode signal so that the data access unit operates in the non-temporal access mode; and
when the difference value does not exceed the predetermined length, generating the mode signal so that the data access unit operates in the temporal access mode.

14. The access method of claim 11, wherein the step of monitoring the access behavior of the data access unit to generate the mode signal further comprises:
- recording an initial address that the data access unit initially accessed according to an initial instruction;
- monitoring a predetermined range starting from the initial address and dividing the predetermined range into a plurality of sub-regions;
- counting an access number of times of each sub-region;
- when a currently-accessed address that is currently accessed according to a current instruction exceeds the sum of the initial address and the predetermined range, counting a number of the sub-regions that the access number of times of each sub-regions exceeds a first threshold; and
- when the number of the sub-regions that the access number of times of each sub-regions exceeds a first threshold does not exceed a second threshold, generating the mode signal, so that the data access unit operates in the non-temporal access mode.

15. The access method of claim 14, wherein the step of monitoring the access behavior of the data access unit to generate the mode signal further comprises:
- when the number of the sub-regions that the access number of times of each sub-regions exceeds a first threshold exceeds the second threshold, generating the mode signal, so that the data access unit operates in the temporal access mode.

16. The access method of claim 9, wherein when operating in the non-temporal access mode, the hardware accelerator directly writes writing data of the instruction to the host memory through the accelerator interface and invalidates data corresponding to the same address of the writing data in the cache.

* * * * *